United States Patent [19]

Anderson et al.

[11] Patent Number: 4,741,503
[45] Date of Patent: May 3, 1988

[54] CAMBER CONTROL SYSTEM

[75] Inventors: Leonard R. Anderson, Phoenix, Ariz.; Ronald W. DeCamp, Dayton, Ohio

[73] Assignee: The Boeing Company, Seattle, Wash.

[21] Appl. No.: 780,204

[22] Filed: Sep. 26, 1985

[51] Int. Cl.$^4$ .............................................. B64C 13/16
[52] U.S. Cl. .................................. 244/203; 244/219; 244/195; 364/442
[58] Field of Search .............. 244/219, 203, 215, 216, 244/191, 194, 182, 195; 364/442, 433, 432

[56] References Cited

U.S. PATENT DOCUMENTS

| | | | |
|---|---|---|---|
| 3,627,236 | 12/1971 | Hess | 244/182 |
| 3,880,385 | 4/1975 | Reynolds | 244/194 |
| 4,127,249 | 11/1978 | Lambregts | 244/191 |
| 4,159,088 | 6/1979 | Cosley | 364/442 |

FOREIGN PATENT DOCUMENTS 1556395 2/1970 Fed. Rep. of Germany ...... 244/203
2096551 10/1982 United Kingdom .

Primary Examiner—Galen Barefoot
Attorney, Agent, or Firm—Seed and Berry

[57] ABSTRACT

A system and method for adjusting the camber of an airfoil extending from an aircraft for optimum flight performance. In the method, a velocity signal is produced that represents the longitudinal velocity of the aircraft. Utilizing the velocity signal, it is determined if a change in camber of the airfoil can increase the aircraft's flight performance. Thereafter, the camber of the airfoil is changed until an optimum flight performance is achieved.

17 Claims, 4 Drawing Sheets

CAMBER CONTROL SYSTEM

BACKGROUND OF THE INVENTION

The present invention relates to an aircraft airfoil control system and more particularly, but not by way of limitation, to a system to adjust the camber of the airfoil in flight for optimum flight performance.

Heretofore, it was well known that any given airfoil design was a compromise between lift and drag. An airfoild was chosen for a particular aircraft according to the intended flight performance and use of the aircraft.

Various devices have been developed to adjust the airfoil's camber to alter the lift/drag ratio for special purposes. One such device is an aircraft's flaps normally used on landing.

With higher emphasis being placed on fuel efficiency, other devices have been developed to alter the camber of the airfoil while the aircraft is in flight to improve the aircraft's performance. One such device is described in U.S. Pat. No. 2,523,427, wherein the camber is adjusted by predetermined increments in response to the aircraft's airspeed measured at the pitot tube. The device described in this patent reacts only in changes in airspeed; however, during certain airspeed changing maneuvers a camber change would be detrimental rather than beneficial. Also, the device changes the camber to a hardwired chosen camber angle. There is no disclosure or suggestion in U.S. Pat. No. 2,523,427 of a device to dynamically adjust the camber in response to changes in the longitudinal velocity of the aircraft.

Other devices have been developed that optimize flight performance by either remotely effecting turn changes (U.S. Pat. Nos. 2,892,601) or by sensing and suppressing flutter in both leading and trailing edge wing surfaces 3,734,432). There is no disclosure or suggestion in either U.S. Pat. Nos. 2,892,601 or 3,734,432 of a device to dynamically adjust the camber in response to changes in the longitudinal velocity of the aircraft.

SUMMARY OF THE INVENTION

The present invention is contemplated to overcome the foregoing deficiencies and provides a system and method for adjusting the camber of an airfoil extending from an aircraft for optimum flight performance. Briefly, a signal is produced representative of the longitudinal velocity of the aircraft. Using this velocity signal, the system determines if an increase or decrease in the camber of the airfoil can increase the aircraft's flight performance. Thereafter, the camber of the airfoil is adjusted in the correct direction until an optimum flight performance is achieved.

The present invention responds to changes in the longitudinal velocity which provides a more accurate performance indication then airspeed measured at a pitot tube.

The present invention also dynamically adjusts the camber of the airfoil rather than only adjusting the camber in predetermined increments directly related to predetermined changes in airspeed.

Further, the present invention has the advantages of using a computationally efficient and simple algorithm.

The advantages and objects of the invention will become evident from the following detailed description of the drawings which illustrate preferred embodiments of the invention.

DETAILED DESCRIPTION OF THE DRAWINGS

Disclosed herein is a system and method for adjusting the camber of an airfoil extending from an aircraft for optimum flight performance. Within the system, a signal is produced representative of the longitudinal velocity of the airfoil. Using the velocity signal, it is determined if an increase or decrease in the camber of the airfoil can increase the aircraft's flight performance. Thereafter, the camber of the airfoil is adjusted in the correct direction until an optimum flight performance is achieved.

Figure 1:
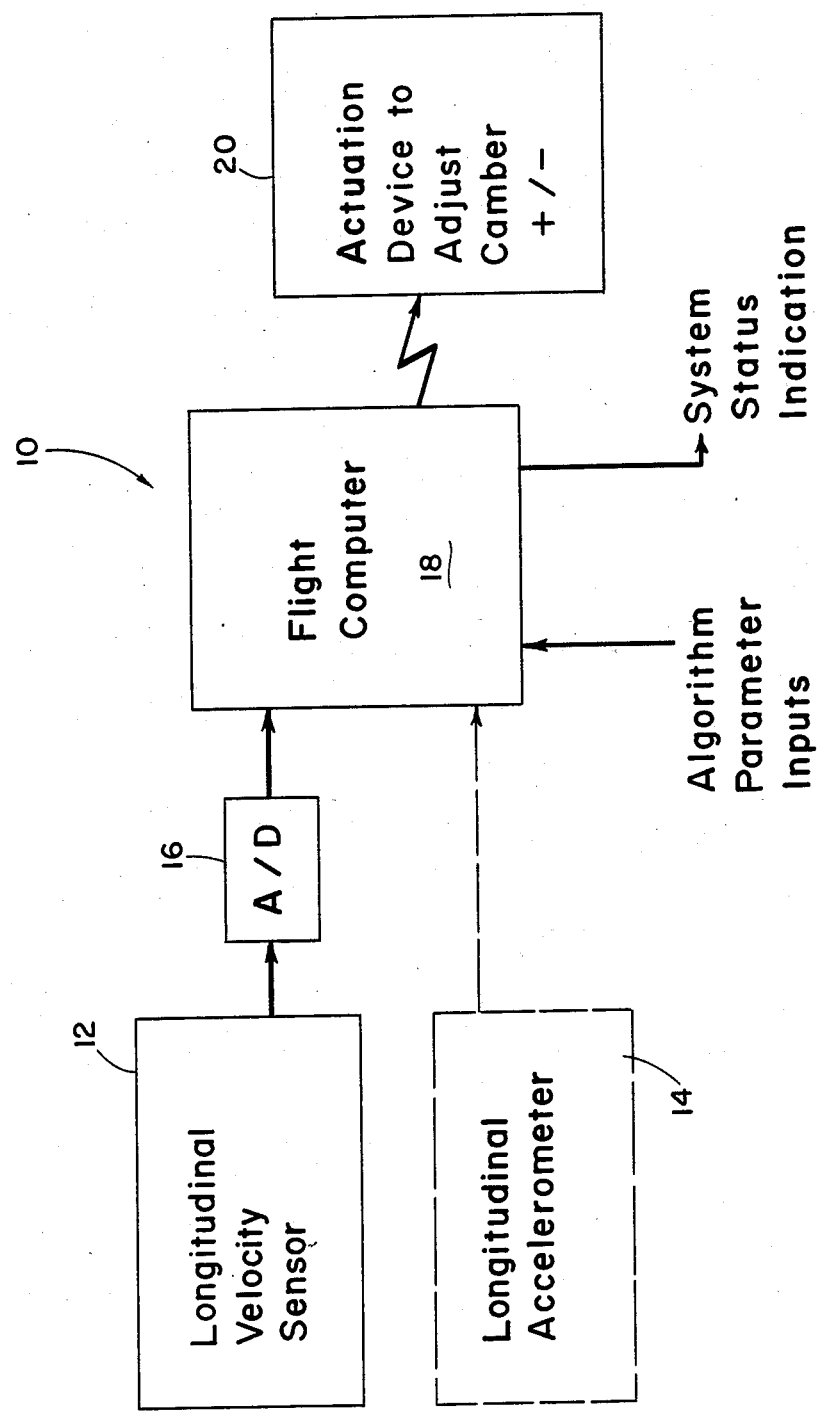
FIG. 1 is a diagramatical representation of the major components of one embodiment of the present invention.

Referring to FIG. 1, the system of the present invention is generally indicated by reference numeral 10. Within the system 10 is a device or sensor 12 for measuring and providing a signal representative of the longitudinal velocity of the airfoil through the air. The device or sensor 12 can be a stand alone unit or can be part of the aircraft's central air data system (not shown). In one embodiment of the present invention the device 12 generates a signal representative of the true airspeed from the aircraft's central air data system. Instead of or along with the device or sensor 12, a longitudinal accelerometer 14 can be used to produce a signal representative of the longitudinal velocity.

The velocity signal(s) if in analog form are converted into a digital form by an analog-digital converter 16 as is well known in the art. The velocity signal in digital form is provided to a programmable digital computer 18 wherein the camber changes are calculated and initiated. The programmable digital computer 18 can be a stand alone unit or can be the aircraft's onboard systems control computer or preferably, the aircraft's attitude control system or "autopilot". As will be described more fully below, one or more algorithms are stored in memory devices (not shown) associated with programmable digital computer 18 for: calculating if a camber change can improve the aircraft's flight performance, what direction—i.e. either an increase or decrease in camber—the change will be, how much of a change in camber is needed, and generating signals to effect the prescribed change(s) in camber.

As stated above, the programmable digital computer 18 generates a signal that causes the camber to be changed. This change occurs by the signal being received by actuation devices 20 operatively connected to the camber changing adjustable surfaces on the aircraft's wings, ailerons, or the like. The adjustable surfaces commanded by the present invention can be either leading edge, trailing edge or both. The actuation devices 20 can be electrical, mechanical, hydraulic or pneumatic as desired. In one embodiment of the present invention, the programmable digital computer 18 generates an electrical signal of a predetermined duration and of a predetermined polarity to cause a servo actuated lever mechanism to cause a camber adjusting surface, such as a trailing edge flap, to be moved in a certain direction a certain amount.

Figure 2:
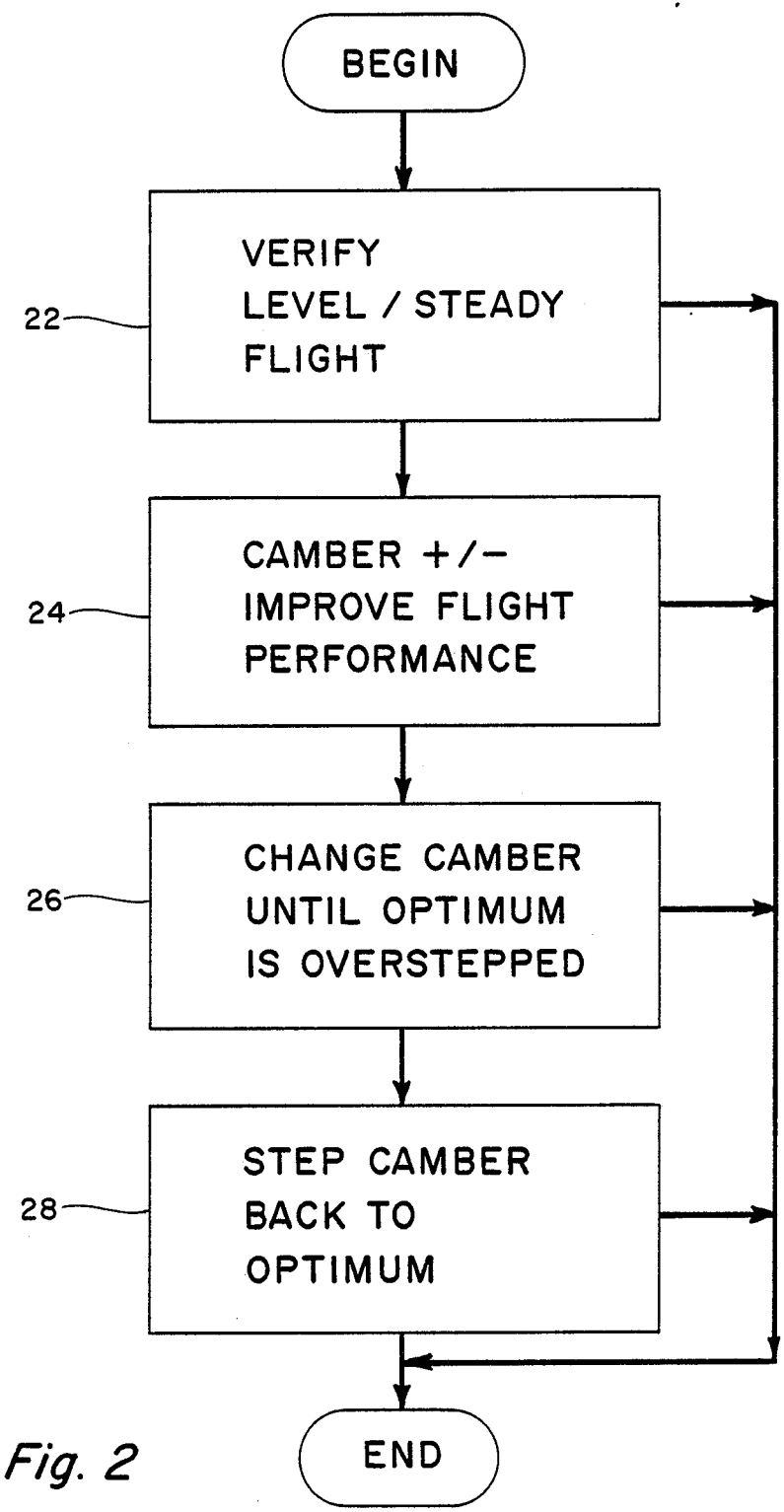
FIG. 2 is a logic flow chart of an algorithm for use in one embodiment of the present invention to optimize an aircraft's flight performance.

In the operation of the present invention algorithms are used to determine how and if the camber is to be adjusted. A logic flow chart of one embodiment of an algorithm is shown in FIG. 2. The method of the present invention can be activated automatically by the attainment of a certain flight parameter, such as speed, angle of attack or altitude. The method can also be activated by a pilot's command, as by pressing the appropriate control mode select button on the aircraft's control panel or control wheel or stick.

In the embodiment of the method of the present invention shown in FIG. 2, the method is activated only when the aircraft has achieved a level and steady flight, such as at cruise, as shown in block 22. After it has been determined that the aircraft is in level and steady flight, the method determines if an increase or a decrease in the airfoil's camber will improve the flight performance, as shown in block 24. After the correct direction has been determined, the method causes the actuation devices 20 to change the camber in the correct direction until a decrease in flight performance is detected, as shown in block 26. Once the decrease in flight performance is detected, the actuation devices 20 move the camber adjusting surfaces of the aircraft in the opposite direction a predetermined amount until the optimum flight performance is achieved, as shown in block 28.

The method of one embodiment of the present invention will be decribed in detail below. The first step of the present invention includes measuring a change $\Delta v_o$ in the longitudinal velocity over a time period $\Delta_t$, such as from about 5 to about 40.0 seconds, with the camber angle lift unchanged from its initial value. If the measured velocity change is smaller in absolute value than a specified tolerance, $E_{vel}$, then it is assumed that the aircraft is in a steady and level flight so the method proceeds. If the measured velocity change is greater than or equal to the specified tolerance, i.e. $/\Delta v_o/ \geq E_{vel}$, an error condition is indicated and the algorithm terminates without changing the camber angle.

The second step of the method includes determining the correct camber change direction. In this step, the camber angle is incremented a predetermined amount $\Delta \delta$ in a first direction, usually a decrease in camber angle. The resulting longitudinal velocity change $\Delta v_1$, is measured. If $\Delta v_1$, is negative, the direction of camber change is reversed and the camber angle is incremented by $2 \Delta \delta$. Again, the resulting longitudinal velocity change $\Delta v_1$, is positive, then the correct change direction has been determined and the algorithm proceeds to the third step. However, if again $\Delta v_1$, is negative, the initial camber angle was an optimum and the initial camber angle is returned.

In the third step, a sequence of $\Delta \hat{v}_1$, measurements are made at time intervals $\Delta t$. The expected next longitudinal velocity measurement $\Delta \hat{v}_1$ corresponding to no camber angle change is estimated. Also, the camber angle is incremented in the correct direction by the amount $\Delta \delta$ and the actual velocity change $\Delta v_1$ is measured. If $\delta v = \Delta v_1 - \Delta \hat{v}_1$, is positive, the sequence of n $\Delta v_1$ measurements are continued and this step is repeated. If $\delta v = \Delta v_1 - \Delta \hat{v}_1$ is negative, the optimum camber angle has been overstepped and the algorithm proceeds to the fourth step.

In the fourth step, the camber angle is changed in the opposite direction by the amount $\Delta \delta$ to step back to the optimum, and the algorithm terminates.

While in the third step it is possible that following the first positive velocity increment $\Delta v_1$ in a measurement cycle, a negative $\Delta v_1$ measurement will occur. In this even, the total velocity change, $$\sum_{j=1}^{m} \Delta v_j,$$

in the current measurement cycle is determined and the algorithm terminates. If the total velocity change is positive, the camber angle is left unchanged. If the total velocity change is negative, the camber angle is incremented by $\Delta \delta$ in the opposite direction to the previous angle setting. This type of abnormal termination or signal indicates that the velocity is decreasing due to factors other than camber variations, such as decreasing vehicle thrust or local wind changes.

The value of $\Delta \delta$, the camber angle change increment, depends on the type and size of aircraft; however, it has been found that $\Delta \delta$ can have values of less than about 0.5° to about 2.0°.

Figure 3:
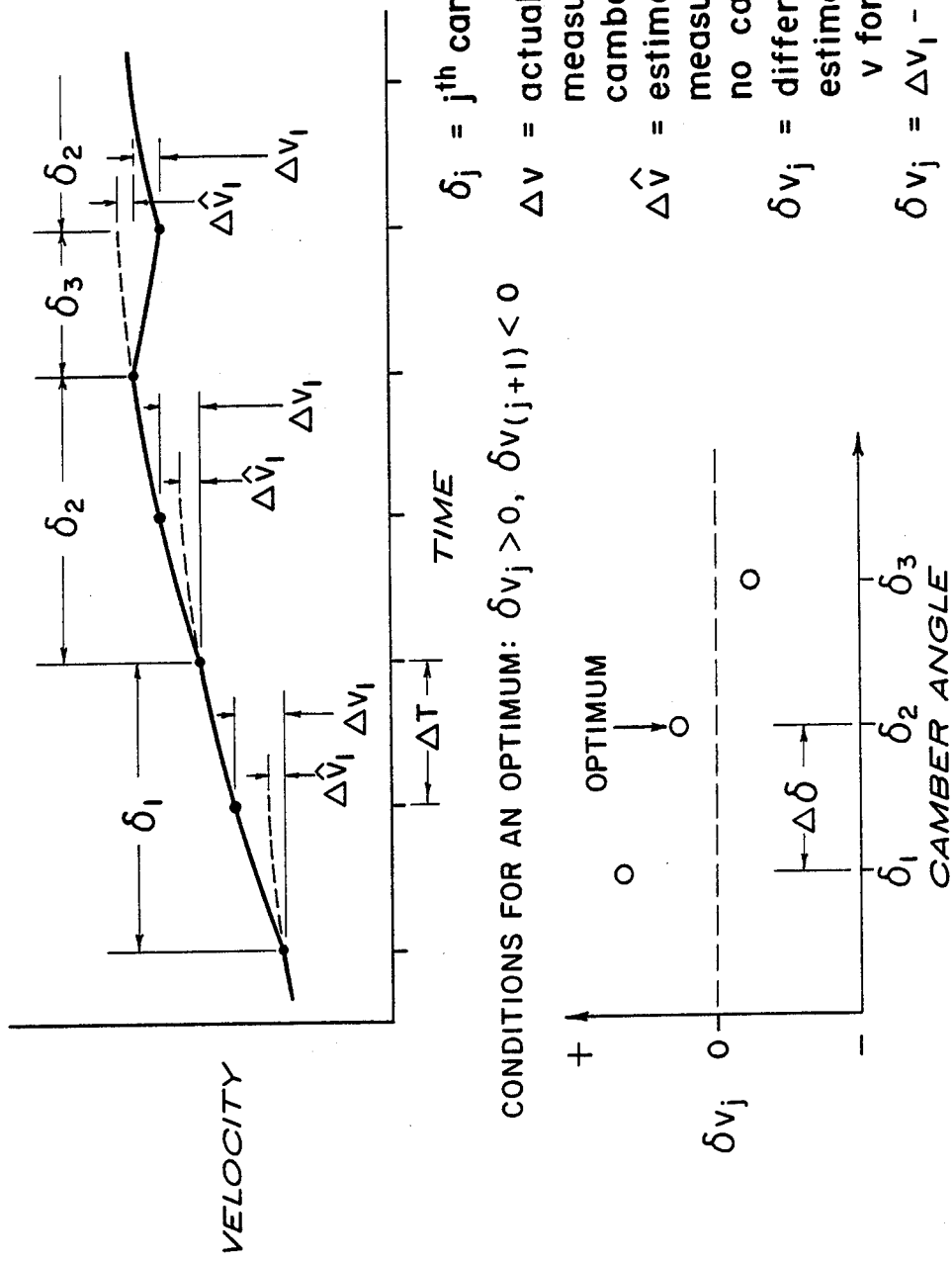
FIGS. 3 and 4 are graphical representations of the optimization of an aircraft's longitudinal velocity utilizing one embodiment of the present invention.

In the estimation of the expected next longitudinal velocity measurement in the third step the following equations and assumptions can be used. If velocity is measured at successive time point, $t_1, t_2 \ldots$ with $t_{i+1} - t_i = \Delta t$, the change in velocity is given by $$\Delta v_i = v(t_i) - v(t_{i-1}) = (v_f - v_o)(1 - e^{-\Delta t/\tau})e^{-(i-1)\Delta t/\tau}$$

$$\Delta v_i = e^{(a+(i-1)b)}$$

where a and b are estimates based on two or more successive measurements $\Delta v_1, \Delta v_2, \ldots$
  $v_o$ = velocity at time = 0
  $v_f$ = asymptotic velocity (at t = ∞)
  $\tau$ = longitudinal time constant
The estimates a and b are periodically undated using the weighted least-squares formula.

$$\hat{a} \approx \ln\{(v_f - v_o)(1 - e^{-\Delta t/\tau})\}$$

$$\hat{a} = \frac{(\Sigma a^i y_i)(\Sigma a^i x_i^2) - (\Sigma a^i x_i y_i)(\Sigma a^i x_i)}{(\Sigma a^i)(\Sigma a^i x_i^2) - (\Sigma a^i x_i)^2}$$

$$\hat{b} \approx -\Delta t/\tau$$

$$\hat{b} = \frac{(\Sigma a^i)(\Sigma a^i x_i y_i) - (\Sigma a^i y_i)(\Sigma a^i x_i)}{(\Sigma a^i)(\Sigma a^i x_i^2) - (\Sigma a^i x_i)^2}$$

where
  $x_i = (i-1)$
  $y_i = \ln(\Delta v_i)$ (must be positive)
  a = estimated relative signal size for measurement weighting
  $1 \geq a \geq e^{-\Delta t/\tau}$ The key input parameters for the algorithm used in the present invention are the camber angle increment magnitude $\Delta \delta$, velocity measurement and time $\Delta t$, the number of measurements in a measurement cycle or, the true velocity tolerance $E_{vel}$, and the estimate of the longitudinal response time constant $\tau$. The effect of these parameters on velocity vs. time and camber change increment vs. camber angle are shown in FIG. 3.

The algorithm described above was tested using our aircraft dynamic analysis program developed by Boeing Computer Services and entitled EASY 5. The initial aircraft conditons were a longitudinal velocity of Mach=0.83 and an aircraft height of 20,000 above sea level.

Figure 4:
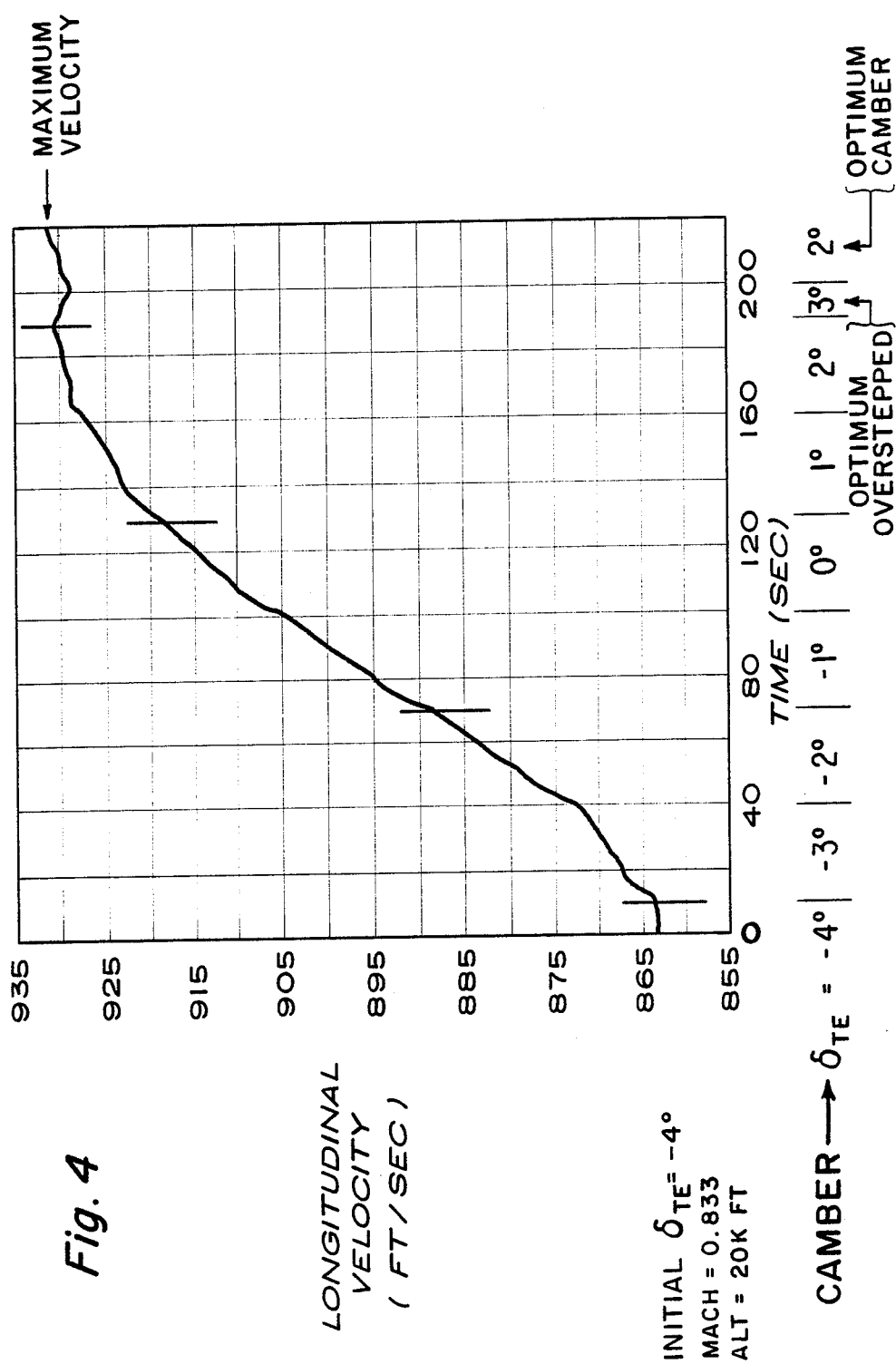

As shown in FIG. 4, the alogorithm was initiated with a negative camber angle of −4° and successfully located the optimum camber angle, +2°, for greatest aircraft longitudinal velocity in about 200 seconds.

As can be understood from the above description, the present invention provides a novel camber control system that utilizes velocity measurements dependent upon camber changes, as well as uses an optimization alogorithm to dynamically adjust the camber angle to optimize aircraft flight performance.

Whereas the present invention has been described in relation to the drawings attached hereto, other modifications apart from those shown or suggested herein, may be made within the scope and spirit of the present invention.

Changes may be made in the construction and arrangement of the parts or elements of the embodiments as described herein without departing from the spirit or scope of the invention defined in the following claims.

What is claimed is:

1. A method of adjusting the camber of an airfoil extending from an aircraft for optimum flight performance, comprising:
   (a) producing a velocity signal representative of the longitudinal velocity of the aircraft;
   (b) utilizing the change in the velocity signal over time to determine if an increase or a decrease in the camber of the airfoil can increase the aircraft's flight performance; and
   (c) increasing or decreasing the camber of the airfoil, as determined in step (b), until an otpimum flight performance is achieved.

2. The method of claim 1 wherein between steps (a) and (b), a step is provided for determining if the aircraft is in approximate level flight, if not then no change is made to the camber of the airfoil.

3. The method of claim 2 wherein the step of determining if the aircraft is in approximate level flight comprises measuring the change in the velocity signal over a given time period, comparing the velocity signal change to a predetermined value, and generating a signal that the aircraft is not in approximate level flight if the velocity signal change is greater than the predetermined value.

4. The method of claim 1 wherein step (b) comprises:
   (i) adjusting the camber of the airfoil a predetermined amount in a first direction,
   (ii) measuring the velocity signal change, and
   (iii) if the velocity signal change is positive, proceeding to step (c) and if the velocity signal change is negative adjusting the camber of the airfoil in a second direction.

5. The method of claim 1 wherein step (c) comprises:
   (i) increasing or decreasing the camber of the airfoil as determined in step (b), by a predetermined amount;
   (ii) measuring the velocity signal change; and
   (iii) adjusting the camber of the airfoil in the direction as in (i) by increments of the predetermined amount until the velocity signal change is negative, then adjusting the camber of the airfoil in the opposite direction by the predetermined amount.

6. A system for adjusting the camber of an airfoil extending from an aircraft for optimum flight performance, comprising:
   (a) a means for producing a signal representative of the longitudinal velocity of the aircraft;
   (b) means for utilizing the change in the velocity signal over time to determine if an increase or a decrease in the camber of the airfoil can increase the aircraft's flight performance; and
   (c) means in operative communication with step (b) for utilizing the signal to adjust the camber of the aircraft's airfoil until optimum flight performance is achieved.

7. The system of claim 6 wherein (a) comprises a true airspeed sensor.

8. The system of claim 6 wherein (a) comprises a longitudinal accelerometer.

9. The system of claim 6 wherein (b) comprises a programmable digital computer to: generate a signal to cause the camber of the airfoil to be adjusted a predetermined amount in a first direction, measure the velocity signal change, and if the velocity signal change is positive generating a positive signal and if the velocity signal change is negative generating a signal to cause the camber of the airfoil to be adjusted in a second direction.

10. The system of claim 6 wherein (c) comprises a programmable digital computer to: generate a signal to cause the camber of the airfoil to be adjusted a predetermined amount in the direction indicated by (b), measure the velocity signal change, adjust the camber of the airfoil by increments of the predetermined amount until the velocity signal change is negative and then adjusting the camber of the airfoil in the opposite direction by the predetermined amount.

11. The system of claim 6 and including means to prevent a camber change if the aircraft is not in approixmately level and steady flight.

12. A method of adjusting the camber of an airfoil extending from an aircraft for optimum flight performance, comprising:
   (a) producing a velocity signal representative of the longitudinal velocity of the aircraft;
   (b) taking at least two samples of said velocity signal within a period that is significantly shorter than the time constant of the aircraft's response to any previous increase or decrease in the chamber of the airfoil;
   (c) predicting from said velocity signal samples the value of said velocity signal at a predetermined future time;
   (d) comparing said velocity signal at said predetermined future time with said predicted velocity signal to determine if the velocity signal is greater than said predicted velocity signal resulting from an improvement in the aircraft's flight performance; and
   (e) increasing or decreasing the camber of the airfoil, as determined in step (b), until an optimum flight performance is achieved.

13. The method of claim 12 wherein said step of predicting the value of said velocity signal is accomplished by a least squares calculation using said velocity signal samples.

14. The method of claim 12 wherein the increase or decrease of said camber angle resulting from a previous comparison of said velocity signal with said predicted velocity signal is accomplished at a time that is subsequent to the taking of said samples for a current comparison of said velocity signal with said predicted velocity signal and prior to said predetermined future time so that said velocity signal at said predetermined future time is a function of a change in the camber angle occurring after the taking of said samples.

15. A system for adjusting the camber of an airfoil extending from an aircraft for optimum flight performance, comprising:
   (a) means for producing a signal representative of the longitudinal velocity of the aircraft;
   (b) sampling means taking at least two samples of said velocity signal within a period that is significantly shorter than the time constant of the aircraft's response to any previous increase or decrease in the camber of the airfoil;
   (c) means in operative communication with step (b) for utilizing the signal to adjust the camber of the aircraft's airfoil until optimum flight performance is achieved;
   (d) calculator means for predicting from said velocity signal samples the value of said velocity signal at a predetermined future time; and
   (e) means for comparing said velocity signal at said predetermined future time with said predicted velocity signal to determine if the velocity signal is greater than said predicted velocity signal resulting from an improvement in the aircraft's flight performance.

16. The system of claim 15 wherein said calculator means includes means for performing a least squares calculation using said velocity signal samples.

17. The system of claim 15 wherein the increase or decrease of said camber angle resulting from a previous comparison of said velocity signal with said predicted velocity signal is accomplished at a time that is subsequent to the taking of said samples for a current comparison of said velocity signal with said predicted velocity signal and prior to said predetermined future time so that said velocity signal at said predetermined future time is a function of a change in the camber angle occurring after the taking of said samples.

* * * * *

UNITED STATES PATENT AND TRADEMARK OFFICE
CERTIFICATE OF CORRECTION

PATENT NO. : 4,741,503

DATED : May 3, 1988

INVENTOR(S) : Leonard R. Anderson et al.

It is certified that error appears in the above-identified patent and that said Letters Patent is hereby corrected as shown below:

Claim 1, line 34, delete "otpimum" and substitute therefor --optimum--.

Claim 11, line 34, delete "approixamately" and substitute --approximately--.

Claim 12, line 44, delete "chamber" and substitute therefor --camber--.

Signed and Sealed this

Seventeenth Day of January, 1989

Attest:

DONALD J. QUIGG

*Attesting Officer*    Commissioner of Patents and Trademarks